United States Patent [19]

Nuttle

[11] Patent Number: 4,552,212

[45] Date of Patent: Nov. 12, 1985

[54] STRUCTURE HEATING AND COOLING SYSTEM

[76] Inventor: David A. Nuttle, 1316 Ravenhurst Dr., Raleigh, N.C. 27609

[21] Appl. No.: 570,851

[22] Filed: Jan. 16, 1984

[51] Int. Cl.⁴ .............................................. B60H 1/00
[52] U.S. Cl. .................................... 165/48.2; 126/400; 126/426; 126/438
[58] Field of Search .......................... 165/48 S, 49, 53; 62/259.1; 126/419, 400, 426, 438; 237/1 R

[56] References Cited

U.S. PATENT DOCUMENTS 4,257,477 3/1981 Maloney ............................ 165/48 S

FOREIGN PATENT DOCUMENTS 3002852 7/1981 Fed. Rep. of Germany ...... 126/438

Primary Examiner—Henry Bennett
Attorney, Agent, or Firm—Mills & Coats

[57] ABSTRACT

This invention is a system for passive solar heating and cooling of homes, offices and other structures whereby the entire building may be used for storage of heat or cold with both collection and storage occuring essentially without any expenditure of other sources of energy.

6 Claims, 8 Drawing Figures

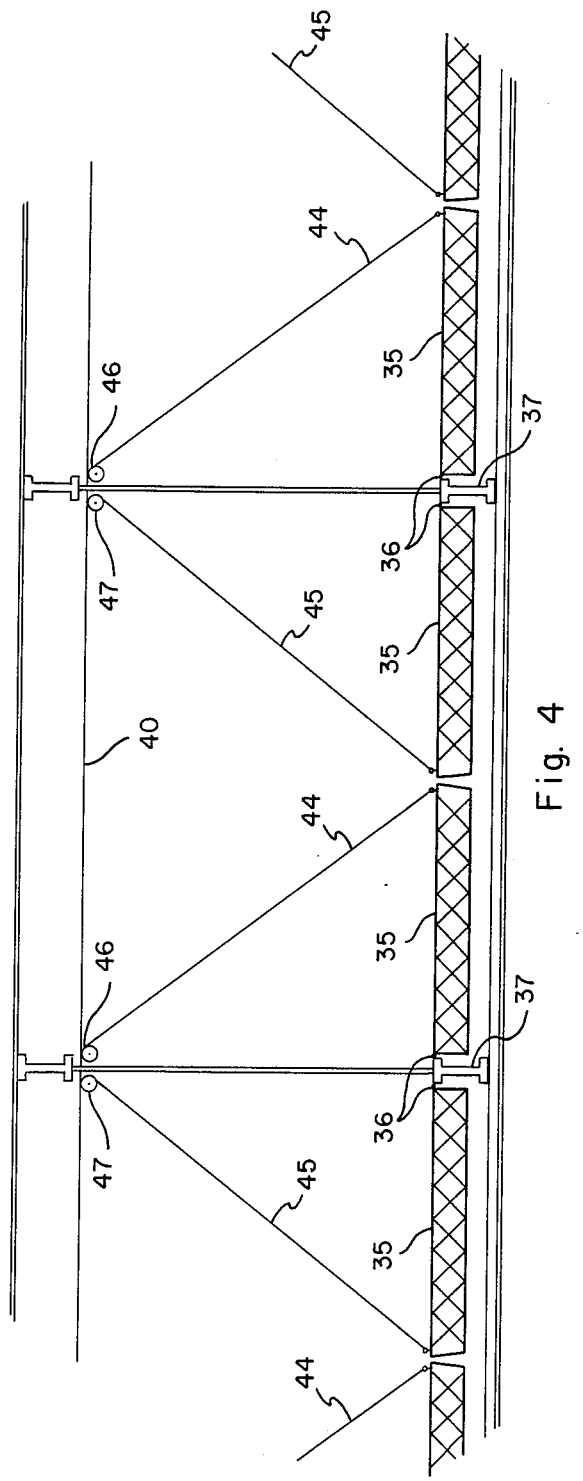
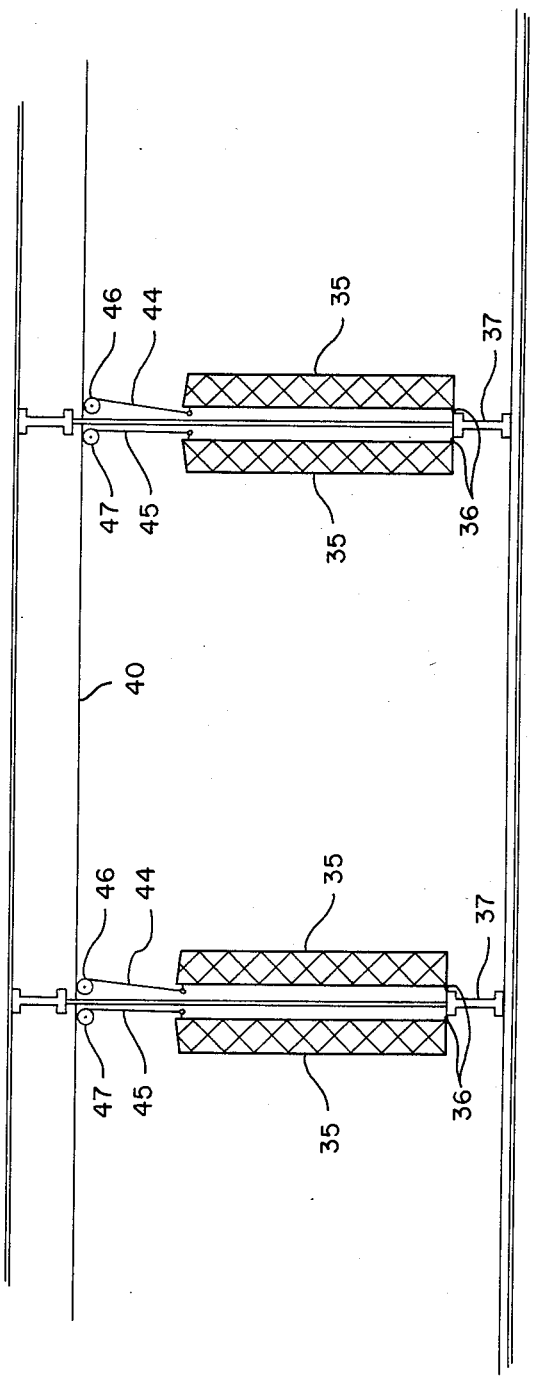
Fig. 4
Fig. 5

STRUCTURE HEATING AND COOLING SYSTEM

FIELD OF INVENTION

This invention relates to solar heating and cooling and more particularly to solar collection and storage by passive means.

BACKGROUND OF INVENTION

Since 1973, the rate of energy inflation has often exceeded the rate of general inflation. This fact increasingly affects the home-ownership ability of most individuals and families. There are no easy solutions to the "energy crunch". The supply of fossil fuels is diminishing. Nuclear plant construction and operation costs have increased greatly. Available biomass could be converted into concentrated fuels, but there is a low efficiency of conversion. New and economical technological solutions—photovoltaics, wind powered generators, ocean tidal generators, thermal systems, alternative fuels and other sources of energy—appear to be years in the future.

In view of the above, the uses and possible uses of solar energy are receiving more and more attention. The true potential of solar energy cannot be determined until many different factors are evaluated. These factors include such things as climatic conditions, outside temperatures, speed and direction of winds, topography, the amount of radiation, azimuth and altitude, shading, solar access, the sun's path, community acceptance, etc.

Assuming that a reasonable potential for solar heating and cooling are available, overall energy savings and the cost of achieving these savings can be determined as follows: First, evaluate the total heating requirements. Next determine what percentage of these requirements can be met by any particular solar collector with or without a complete storage system. Then analyze the overall cost of any proposed solar system considering actual energy savings, as well as dollar savings, when compared to conventional or alternative heating methods.

For example: The average daily winter space-heating requirements for a typical house in Raleigh, N.C., are about 2.32 therms or 23,200 BTU's (British Thermal Units) per day. At this same location, the average Jan. BTU's per square foot/day are 867 on a horizontal surface and 945 for a vertical surface. At the optimum space-heating-collection angle for Raleigh (approximately 45°), an average of 1,282 BTU's sq. ft./day are available.

A good 60 square foot active solar collector will cost from five to six thousand dollars. Such an active unit will collect some 650 to 800 BTU's sq. ft./day. An efficient water or rock storage system—or "phase change" storage material—will cost an additional four to seven thousand dollars. If properly constructed, these systems can store 95% of the heat collected. Any of these systems have a daily potential of 45,600 BTU's (60 sq. ft. times 800 BTU's times 95%), or nearly two days' heating supply. When there are two or more consecutive winter days with cloud cover, space-heating will have to be provided by a back-up system. Given total cost of collectors, storage, and back-up heating, an active solar design does not appear to be cost-effective in terms of 1983 dollars.

If solar space-heating is to pay for itself in today's economy with its high interest rates, people have begun to think in terms of direct solar gain. Although many experimental structures have been built, adequate passive heat storage capacity as well as adequate insulating means to prevent heat loss during non-solar periods have plagued the industry and has made passive solar structures something less than completely desirable.

BRIEF DESCRIPTION OF INVENTION

After much research and study into the above-mentioned problems, the present invention has been developed to provide an efficient and economical means of passively solar heating and cooling.

The above is accomplished by making the entire roof a passive collector. The mass of the house (brick walls and tile floors over a concrete slab) act as a thermal storage medium. The whole roof is glazed and oriented at 45° so that about three to four hundred BTU's sq. ft./day are collected in Jan. at, for example, Raleigh, N.C. This is for single glazing. Use of double glazing will increase collection to not less than five hundred BTU's sq.ft./day. With solar radiation striking most of the floor and the surface of all south-facing walls, some 50% of the heat collected is stored. Good quality, high-density masonry will release this heat slowly at the rate needed to maintain internal house temperatures at approximately 68° to 73° F. during winter. A single-glazed area of 40 to 60 feet has the potential to collect 960,000 BTU's/day while storing about 480,000 BTU's/day. This is adequate to provide several days' heating requirements if an insulated ceiling (R-20 or better) is used to prevent heat loss during hours when solar radiation is not available. Since insulated curtains, insulated shutters, and other devices *now* available to reduce heat loss from skylights and windows, are too expensive and too impractical for use on an entire ceiling, a new solution in the form of ceiling doors has been found to economically make the entire structure a passive collector.

Solar cooling is accomplished via passive means such as the chimney effect whereby cool night air is drawn across the floor and walls to replace hot air escaping, by natural convection currents, through ceiling and ridge vents. The mass of the house, cooled by the previous night's air, generally reduces inside temperatures 15° to 25° F. when compared to outside temperatures. Venting must be halted during the summer daytime to deter entry of the hotter outside air.

In view of the above, it is an object of the present invention to provide both a glazed ceiling and a glazed roof to facilitate solar collection on the entire mass of the structure being heated.

Another object of the present invention is to provide for masonry storage walls in efficient locations for passive solar storage.

Another object of the present invention is to provide glazed east-west internal walls to allow nearly complete solar access to floor areas.

Another object of the present invention is to provide movable, heavily insulated doors over the glazed ceiling to provide direct solar access to the floor and walls of the structure when open on a winter day and to provide insulation when closed on a winter night.

Another object of the present invention is to allow utilization of insulated ceiling doors to reflect heat and provide shade when closed on summer days and to speed outward radiation of internal heat when open during summer nights.

Another object of the present invention is to provide efficient ceiling and ridge or other vents to create a solar chimney effect on summer nights.

Another object of the present invention is to provide an additional isolated gain system in the form of a greenhouse to increase the efficiency of thermal storage of the masonry walls.

Another object of the present invention is to provide automatically operated insulated doors over the ceiling of a solar structure.

Another object of the present invention is to provide an additional heat storage/insulation buffer for protection against winter winds from the north.

Other objects and advantages of the present invention will become apparent and obvious from a study of the following description and the accompanying drawings which are merely illustrative of such invention.

BRIEF DESCRIPTION OF FIGURES

FIG. 4 is a sectional view taken through lines 4—4 of FIG. 2;

FIG. 5 is a sectional view taken through lines 5—5 of FIG. 3;

DETAILED DESCRIPTION OF THE INVENTION

Figure 1:
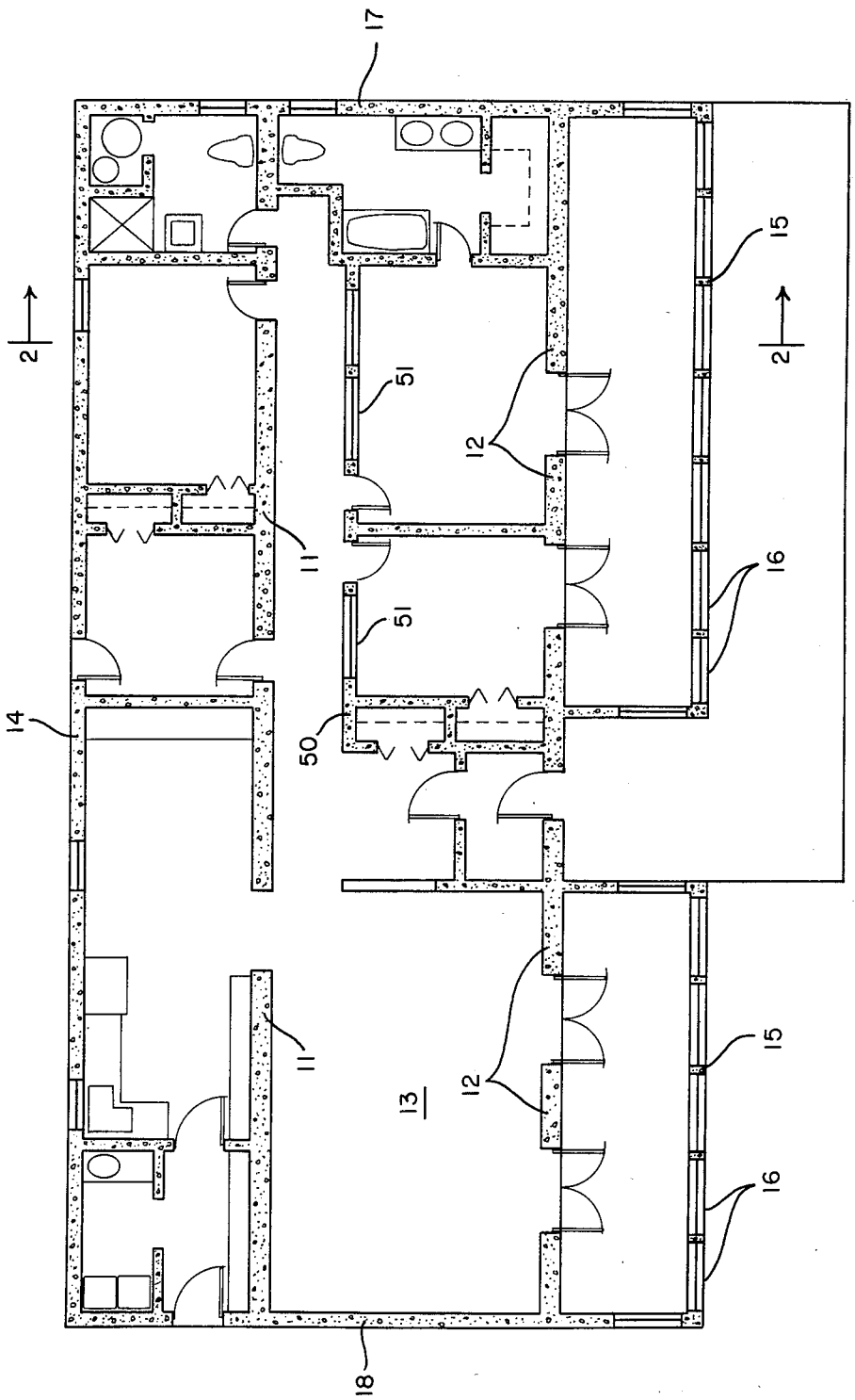
FIG. 1 is a plan view of a typical building structure utilizing the passive solar features of the present invention.

With further reference to the drawings, the improved structure heating and cooling system of the present invention, indicated generally at 10, includes high density masonry interior heat storage walls 11 and 12 and a high density masonry heat storage floor 13.

The structure 10 of the present invention is oriented with wall 14 being on the north side, and preferably heavily insulated, and at least 6" thick. Along the southern wall 15 of the present invention is provided a glazing such as Qualex polycarbonate or similar commercially available material. Also either single or double glazing can be used, it of course being recommended that where cost effective, such as in colder climates, that doubling glazing be used.

The east and west walls 17 and 18 of structure 10 are more or less standard in configuration and construction.

The roof of structure 10 is composed of a northerly disposed roof 19 and a southerly disposed roof 20. The north roof is constructed of standard wood or steel trusses 21 supported by standard wood or steel stringers 22 and includes sheet metal or other suitable covering 23.

The southern roof 20 is constructed from standard wood or steel trusses 24 supported by standard wood or steel stringers 25. Steel is suggested due to the excessive drying, and strength reduction, of wood members when wood is repeatedly exposed to direct sunlight and prolonged temperatures in excess of 150° F. The roof covering 26, however, is formed from a glazing material similar to that indicated at 16 although it of course is only necessary to have one layer at this location.

Fixed ceiling insulation 27 is provided adjacent the north wall 14 and above storage wall 12. The portion 28' of this last mentioned ceiling insulation overhangs into sun space or sun room 29 to shade heat storage wall 12 during the summer months when the sun is at a high azimuth.

Figure 2:
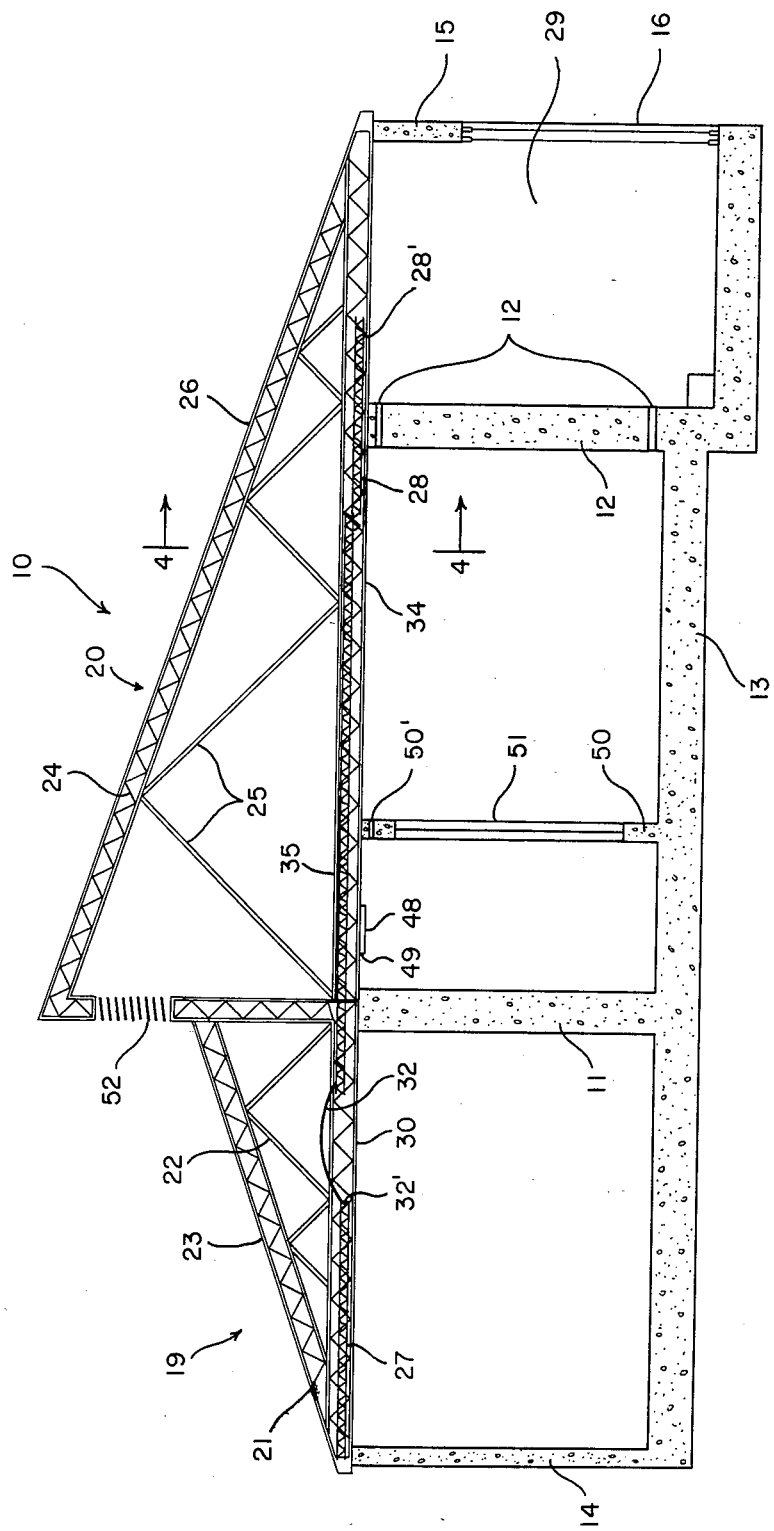
FIG. 2 is a sectional view taken through lines 2—2 of FIG. 1.
Figure 3:
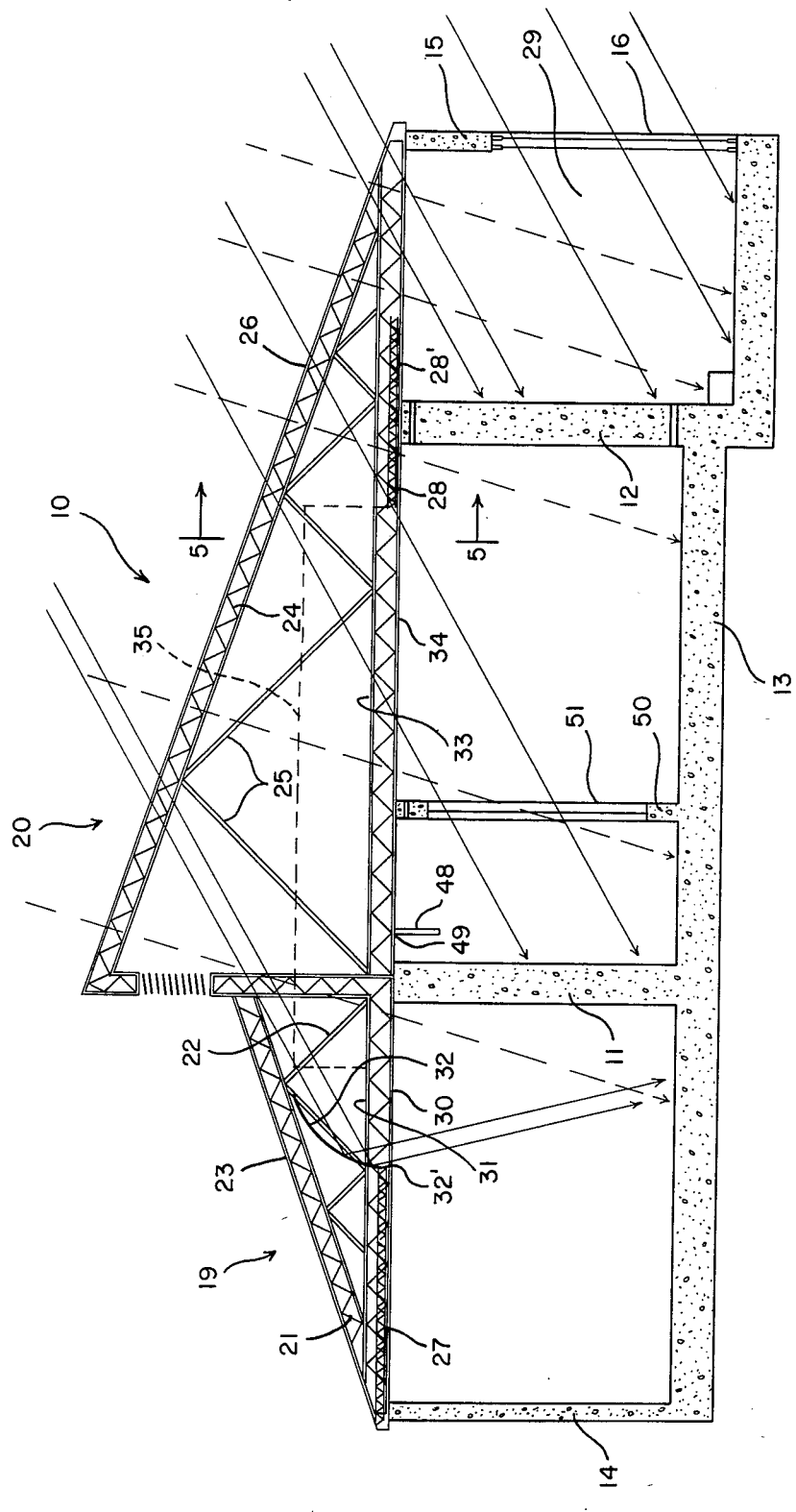
FIG. 3 is a sectional view similar to that shown in FIG. 2 illustrating the collection of solar energy.

Double glazing 30 is provided over opening 31 running east/west along the ceiling of structure 10. An insulated concave reflector 32 is provided which, when opened by means such as pulley 33 and line 34, will reflect sun rays on the north side of heat storage wall 11 as can clearly be seen in FIG. 3, and yet, when in the closed position shown in FIG. 2, will prevent heat loss from radiating through glazing 30.

Extending between opening 31 and fixed ceiling insulation 28 is an opening 33 having double glazing 34 covering the same. A plurality of insulated ceiling doors 35 are hingedly mounted at 36 to ceiling trusses 37.

Figure 6:
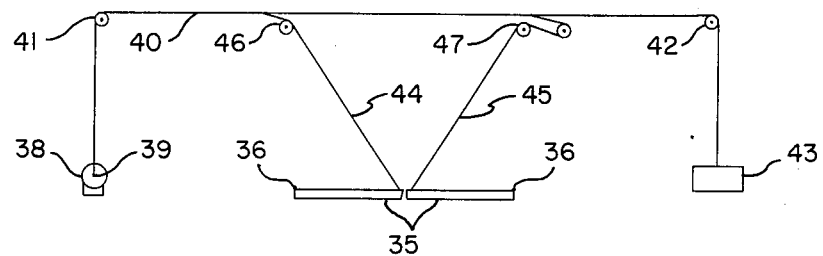
FIG. 6 is a somewhat schematic representation of the operating means for the ceiling doors with the same in closed position.
Figure 7:
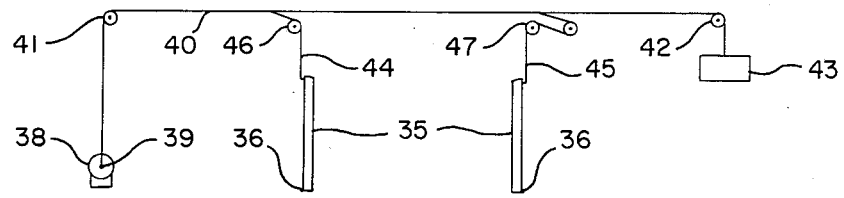
FIG. 7 is a somewhat schematic representation of the operating means for the ceiling doors with the same in open position.
Figure 8:
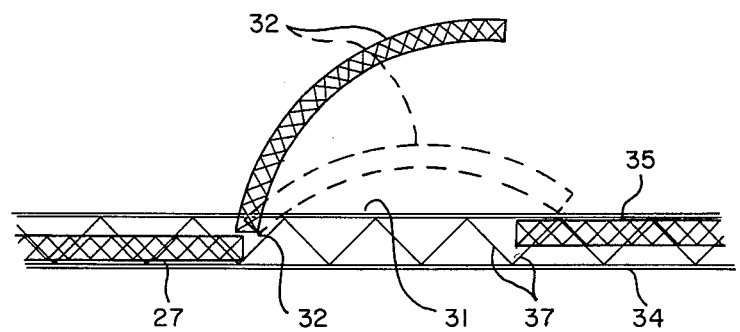
FIG. 8 is an enlarged view of the ceiling reflector portion of the present invention.

To open the ceiling doors 35 a means such as that illustrated in FIGS. 6 and 7 can be provided. The form of door openers provided includes a motor 38 with a take up reel 39 operatively associated therewith. A static line 40 is connected to the take up reel in the normal manner of such devices. The line 40 is then trained over pulleys 41 and 42 and is connected at its opposite end to static weight 43 which maintains tension on the system.

Opening lines 44 and 45 are connected at one end to one of the respective ceiling doors 35 on the edge opposite the hinge 36. The other end of the opening lines are connected to static line 40 after being trained over pulleys 46 and 47 respectively.

As illustrated in FIG. 6, when the take up reel 39 is unwound against the force of weight 43, lines 44 and 45 will allow ceiling doors 35 to close. Since these doors are heavily insulated they will effectively insulate opening 33.

Whenever it is decided to allow solar rays to enter the structure 10 of the present invention, the motor 38 is activated to motivate take up reel 39 which pulls static line 40 and its connected opening lines 44 until the doors are in the position shown in FIG. 7. Once this position is reached the motor is turned off either manually or by way of a limit switch (not shown).

The interior walls 50 of structure 10 which are not of the heat storage type include glazed portions 51 so that solar rays can pass therethrough to reach the nearby heat storage walls and floors as will hereinafter be described in greater detail.

Ceiling vents 48 are provided through ceiling glazing 34 and are hinged at 49. It should be noted that these vents are located adjacent heat storage wall 11.

During summer nights when it is desired to remove as much heat from the structure 10 as possible, the ceiling vents 48 are opened as are the ceiling doors 35 as hereinabove described. Also upper and lower vents 52 and 53 through heat storage wall 12 are opened as are vents 54 in the interior walls 50. Likewise roof vent 52 is opened which creates a chimney effect with natural convection currents causing excessive heat to be expelled through such roof vents 52 as cooler ambient air is drawn in from the outside of the structure 10 and passed through and over the heat storage walls and floors to remove heat therefrom and to cool the same down in preparation for the next day.

The above described venting is, of course, halted during summer daytime hours to deter the entry of ambient air which is hotter than that inside the structure 10.

The floor plan shown in FIG. 1 illustrates how the heat storage walls 11 and 12 and the heat storage floor 13 as well as the interior glazed walls 50 can be operatively arranged relative to each other. It is to be understood, of course, that any number of other interior arrangements can be used while still utilizing the inventive concepts of the present invention.

From the above it can be seen that the present invention provides a relatively simple and yet highly efficient passive structure heating and cooling system which requires the use of practically no energy source other than natural solar energy.

The present invention, may of course, be carried out in other specific ways then those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An improved heating and cooling system comprising: a structure having at least one interior thermal storage wall, a plurality of interior partition walls, a floor, a ceiling, and a roof; at least a portion of said thermal storage wall being constructed of a relatively high density material capable of storing alternately relatively large amounts of positive and negative BTU's; at least a portion of said partition walls being constructed of a solar transmissive material; at least a portion of said floor being constructed from a relatively high density material capable of storing alternately relatively large amounts of positive and negative BTU's; at least a portion of said ceiling having an opening therein with an openable closure operatively associated therewith; means associated with said openable closure for reflecting solar energy onto portions of said high density wall and floor not otherwise in a position to passively receive solar energy; a relatively transparent glazing covering said ceiling opening; and at least a portion of said roof having an equatorial exposure with relatively transparent glazing forming the cover thereof whereby when it is desired to passively collect solar energy, the closure over said ceiling opening can be opened to allow solar energy to pass through said roof, through said ceiling, and to be stored in said high density wall and floor.

2. The improved system of claim 1 wherein said ceiling is double glazed.

3. The improved system of claim 1 wherein said ceiling closure is insulated.

4. The improved system of claim 1 wherein an openable roof vent and an openable passage through said ceiling glazing is provided whereby excess heat within said structure can be vented therefrom.

5. The improved system of claim 1 wherein air passages are provided through said storage wall whereby faster cooling can be accomplished during negative BTU storage.

6. The improved system of claim 1 wherein said means for reflecting solar energy includes a reflective surface on said openable closure.

* * * * *